US012617188B2

(12) United States Patent
Mori et al.

(10) Patent No.: US 12,617,188 B2
(45) Date of Patent: May 5, 2026

(54) LAMINATE AND PACKAGE

(71) Applicant: Fujimori Kogyo Co., Ltd., Tokyo (JP)

(72) Inventors: Toshihiko Mori, Tokyo (JP); Naoto Fujikawa, Tokyo (JP); Hiroshi Kuwabara, Tokyo (JP)

(73) Assignee: ZACROS Corporation, Tokyo (JP)

( * ) Notice: Subject to any disclaimer, the term of this patent is extended or adjusted under 35 U.S.C. 154(b) by 264 days.

(21) Appl. No.: 18/029,573

(22) PCT Filed: Oct. 25, 2021

(86) PCT No.: PCT/JP2021/039286
§ 371 (c)(1),
(2) Date: Mar. 30, 2023

(87) PCT Pub. No.: WO2022/092021
PCT Pub. Date: May 5, 2022

(65) Prior Publication Data
US 2023/0364892 A1     Nov. 16, 2023

(30) Foreign Application Priority Data

Oct. 26, 2020     (JP) ................................. 2020-178893

(51) Int. Cl.
B32B 27/08          (2006.01)
B32B 7/12          (2006.01)
          (Continued)

(52) U.S. Cl.
CPC ............... B32B 27/08 (2013.01); B32B 7/12 (2013.01); B32B 27/32 (2013.01); B65D 65/40 (2013.01);
          (Continued)

(58) Field of Classification Search
CPC .. B32B 27/08; B32B 7/12; B32B 7/32; B32B 2250/02; B32B 2250/242; B32B 2255/10;
          (Continued)

(56) References Cited

U.S. PATENT DOCUMENTS

2016/0031191 A1* 2/2016 Paulino ................... B32B 27/32
                                                                428/220

FOREIGN PATENT DOCUMENTS

CN          110300659 A     10/2019
JP          5662942 U       5/1981
          (Continued)

OTHER PUBLICATIONS

English machine translation for JP2020-157727 (Year: 2020).*
          (Continued)

*Primary Examiner* — Michael C Miggins
(74) *Attorney, Agent, or Firm* — Harris Beach Murtha Cullina PLLC

(57)          ABSTRACT

This laminate has an inner layer formed of a polyethylene-based resin, an outer layer formed of a polyethylene-based resin, and a barrier layer laminated between the inner layer and the outer layer. The inner layer is formed as a sealant layer that is an innermost layer of the laminate, and the barrier layer is laminated in contact with an outer surface of the inner layer. Accordingly, it is possible to provide a laminate and a package which are formed of a mono-material and have a barrier property.

7 Claims, 2 Drawing Sheets

(51) Int. Cl.

| | | |
|---|---|---|
| *B32B 27/32* | (2006.01) | |
| *B65D 65/40* | (2006.01) | |
| *B65D 75/00* | (2006.01) | |
| *B65D 75/58* | (2006.01) | |

(52) U.S. Cl.
CPC ....... *B65D 75/008* (2013.01); *B65D 75/5883* (2013.01); *B32B 2250/02* (2013.01); *B32B 2250/242* (2013.01); *B32B 2255/10* (2013.01); *B32B 2255/28* (2013.01); *B32B 2307/4023* (2013.01); *B32B 2439/46* (2013.01)

(58) Field of Classification Search
CPC ........ B32B 2255/28; B32B 2307/4023; B32B 2439/46; B32B 15/08; B32B 15/085; B32B 15/18; B32B 27/12; B32B 27/30; B32B 27/38; B32B 27/40; B32B 2250/03; B32B 2250/24; B32B 2264/00; B32B 2307/72; B32B 2307/75; B32B 27/18; B32B 2270/00; B32B 2272/00; B32B 2307/7376; B32B 2439/70; B32B 2439/80; B32B 3/08; B32B 27/304; B32B 27/306; B32B 2255/20; B32B 2255/205; B32B 2255/26; B32B 2307/514; B32B 2307/7246; B32B 2307/7265; B32B 2307/31; B32B 2307/7244; B32B 2439/60; B65D 65/40; B65D 75/008; B65D 75/5883; C08L 23/04; Y02W 30/80
See application file for complete search history.

(56) References Cited

FOREIGN PATENT DOCUMENTS

| JP | 2010265020 A | 11/2010 |
|---|---|---|
| JP | 2011131565 A | 7/2011 |
| JP | 2013039932 A | 2/2013 |
| JP | 2020157722 A | 10/2020 |
| JP | 2020157724 A | 10/2020 |
| JP | 2020157727 A | 10/2020 |

OTHER PUBLICATIONS

English machine translation for JP2020-157722 (Year: 2020).*
International Search Report for Application No. PCT/JP2021/039286 dated Dec. 7, 2021 (with English translation).
Search Report from the European Patent Office for Application No. 21886139.1 dated Jul. 16, 2024.
Office Action from Chinese Patent Office for Application No. 202180066488.6 dated Jan. 19, 2026.

* cited by examiner

LAMINATE AND PACKAGE

FIELD OF THE INVENTION

The present invention relates to a laminate and a package.

Priority is claimed on Japanese Patent Application No. 2020-178893, filed Oct. 26, 2020, the content of which is incorporated herein by reference.

BACKGROUND OF THE INVENTION

In paragraph 0012 of Japanese Unexamined Patent Application, First Publication No. 2010-265020 and paragraph 0010 of Japanese Unexamined Patent Application, First Publication No. 2013-265020, as a film used for a packaging bag in the related art, a laminated film obtained by laminating a polyolefin-based resin such as low-density polyethylene, linear low-density polyethylene, an ethylene-vinyl acetate copolymer, and polypropylene as a sealant layer on a base film such as biaxially oriented polypropylene, biaxially oriented polyamide, and biaxially oriented polyester is described.

SUMMARY OF THE INVENTION

Technical Problem

In recent years, regarding the recovery of used plastic container or packages, there is a problem that a packaging bag containing two or more resins is difficult to recycle as a plastic container or package. To facilitate recycling, mono-material container packages using a single resin have been proposed. As a single resin, a polyethylene-based resin is inexpensive and easy to process, but has the problem of a poor barrier property and easy penetration of low-molecular-weight components such as perfumes.

The present invention has been made in view of the above circumstances, and an object of the present invention is to provide a laminate (laminated sheet) and a package which are formed of a mono-material and have a barrier property.

Solution to Problem

In order to solve the above problems, a laminate according to the present invention includes: an inner layer formed of a polyethylene-based resin; an outer layer formed of a polyethylene-based resin; and a barrier layer laminated between the inner layer and the outer layer, wherein the inner layer is formed as a sealant layer that is an innermost layer of the laminate, and wherein the barrier layer is laminated in contact with an outer surface of the inner layer.

The barrier layer may be a barrier coat layer formed on the outer surface of the inner layer.

The films included in the laminate may be only the inner layer and the outer layer formed of a polyethylene-based resin film.

A base layer included in the laminate may be only the outer layer formed of a polyethylene-based resin.

The inner layer may be formed of a non-oriented polyethylene-based resin, and the outer layer may be formed of an oriented polyethylene-based resin.

A thickness of the barrier layer may be 5 μm or less.

The barrier layer and the outer layer may be laminated via an adhesive layer.

A printing layer may be laminated between the barrier layer and the outer layer.

Moreover, a package according to the present invention is formed of the laminate.

Advantageous Effects of Invention

According to the present invention, it is possible to provide a laminate and a package which are formed of a mono-material and have a barrier property.

DETAILED DESCRIPTION OF THE INVENTION

The present invention will be described below on the basis of preferred embodiments. A laminate of an embodiment has an inner layer formed of a polyethylene-based resin, an outer layer formed of a polyethylene-based resin, and a barrier layer laminated between the inner layer and the outer layer.

Figure 1:
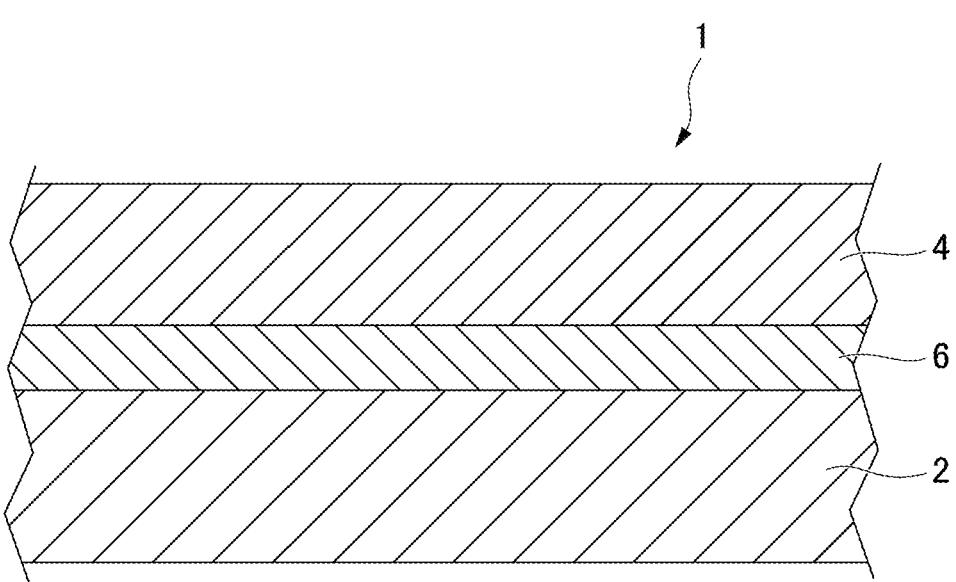
FIG. 1 is an enlarged cross-sectional view showing an embodiment of a laminate of the present invention.
Figure 2:
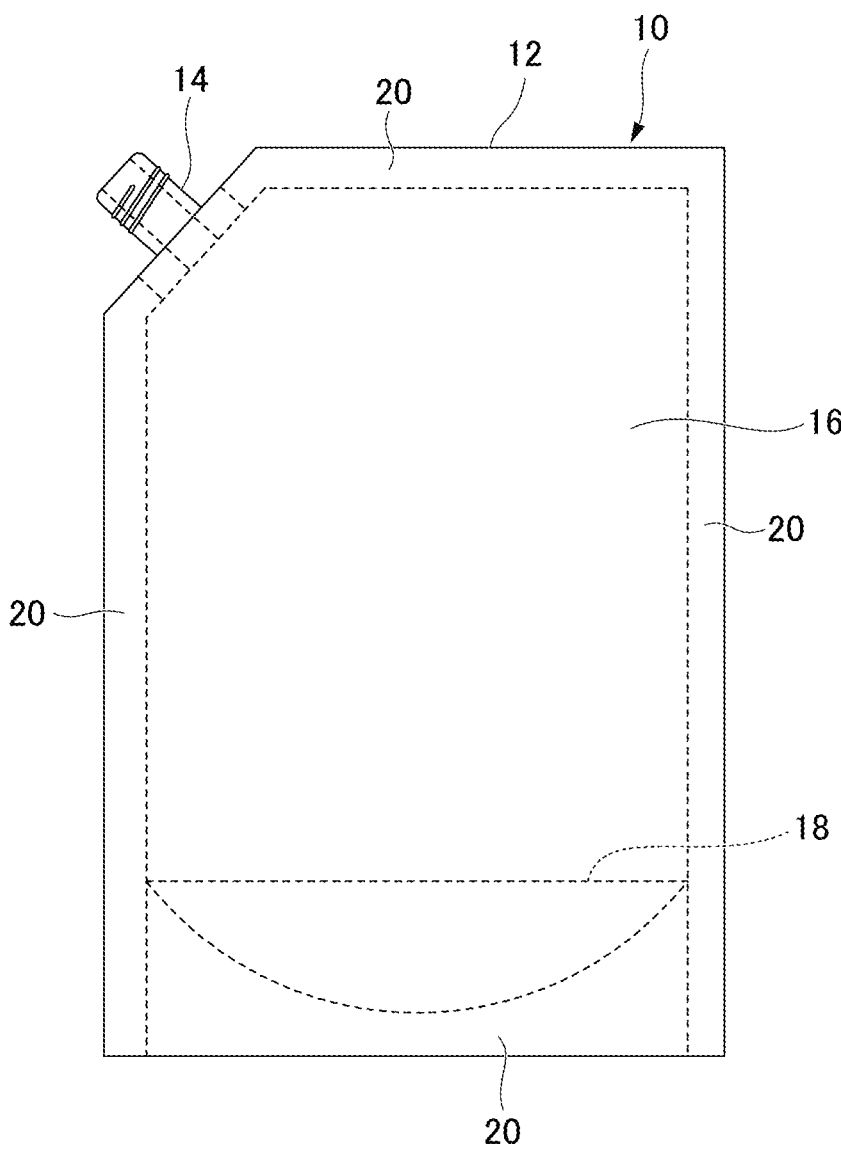
FIG. 2 is a front view showing an embodiment of a package of the present invention.

FIG. 1 is an enlarged cross-sectional view showing a laminate 1 that is an example of the present embodiment. The laminate (laminated sheet) 1 has an inner layer 2, an outer layer 4, and a barrier layer 6 laminated between the inner layer 2 and the outer layer 4. FIG. 2 is a front view showing a standing pouch 10 as an example of a package using the laminate 1. This standing pouch 10 includes a hollow container body 12 and a spout member 14 attached to one end of the container body 12. The container body 12 is formed of, for example, two rectangular body films 16 having the same planar shape and a bottom film 18. Both the body film 16 and the bottom film 18 are formed of the laminate 1, and the outer edges of the inner layers 2 are heat-sealed to each other to form a heat-sealed portion 20. As a result, the container body 12 has a bag-like shape as a whole, and contents can be put into and taken out of the container body 12 through the spout member 14. In a state where no contents are put in, the container body 12 is crumpled and flattened. The present invention is not limited to the standing pouch but can be applied to various packages using a laminate, and can provide a package which is formed of a mono-material and has a good barrier property.

The inner layer is disposed as the innermost layer on the inner surface of the laminate. The inner layer can be used as a sealant layer for joining laminates. The inner layer is preferably formed of a non-oriented polyethylene-based resin. Examples of the thickness of the inner layer include, but are not particularly limited to, about 60 to 180 μm. The sealant layer may have two or more polyethylene-based resin layers. The polyethylene-based resin layer of the sealant layer can be formed of a polyethylene-based resin film.

Specific examples of a material forming the inner layer include a relatively low-density polyethylene-based resin such as linear low-density polyethylene (LLDPE) or low-density polyethylene (LDPE). The material forming the inner layer may be one kind of polyethylene-based resin or a blend of two or more kinds of polyethylene-based resins.

The outer layer is laminated on the outside of the inner layer in the thickness direction of the laminate. The outer layer may be the outermost layer disposed on the outer surface of the laminate. Another layer may be laminated on the outside of the outer layer. It is preferable for the outer layer to be able to reinforce the mechanical strength of the laminate. The outer layer can be used as a base layer when the laminate is transported in a longitudinal direction for use. In the laminated film of the related art, a PET film or the like is used as a base layer, but in the laminated body of the embodiment, a polyethylene-based resin film is used as a base layer, and thus recyclability is improved. Examples of the thickness of the outer layer include, but are not particularly limited to, about 10 to 50 μm. The base layer may have two or more polyethylene-based resin layers. The polyethylene-based resin layer of the base layer can be formed of a polyethylene-based resin film. The base layer included in the laminate may be only the outer layer.

The outer layer is preferably a resin layer formed of an oriented polyethylene-based resin, but may be a resin layer formed of a non-oriented polyethylene-based resin. The oriented polyethylene-based resin layer and the non-oriented polyethylene-based resin layer may be used together as the outer layer disposed on the outside of the inner layer. Specific examples of a material forming the outer layer include relatively high-density polyethylene-based resins such as medium-density polyethylene (MDPE) and high-density polyethylene (HDPE). The material forming the outer layer may be one kind of polyethylene-based resin or a blend of two or more kinds of polyethylene-based resins.

The above-described polyethylene-based resin used for the inner layer or the outer layer may be a homopolymer of ethylene or an ethylene-based copolymer. Examples of a monomer (a comonomer) other than ethylene include one or two or more of an α-olefin such as 1-butene, 1-hexene, or 1-octene, a cyclic olefin such as norbornene, and a vinyl-based monomer such as vinyl acetate, vinyl chloride, or acrylic acid. In a case where the polyethylene-based resin is copolymerized with a monomer having an ester group such as vinyl acetate, a part of the ester group may be saponified to form a copolymer containing vinyl alcohol.

The proportion of ethylene in the constituent monomers of the polyethylene-based resin is preferably 50% by weight or more, and may be, for example, 80% to 100% by weight. The ethylene or the comonomer may be a compound derived from a fossil resource such as petroleum, or may be a compound derived from biomass such as a plant. The resin contained in the inner layer or the outer layer may be only the polyethylene-based resin. The inner layer or the outer layer may contain an additive other than the resin. Examples of the additive include, but are not particularly limited to, an antioxidant, a lubricant, an antiblocking agent, a flame retardant, an ultraviolet absorber, a light stabilizer, an antistatic agent, a colorant, and a crosslinking agent.

The proportion occupied by the inner layer with respect to the thickness of the laminate is preferably 50% or more, and may be about 60%, 70%, 80%, 90%, 95%, or a range between two of these values. The proportion occupied by the total thickness of the inner layer and the outer layer with respect to the thickness of the laminate is preferably 50% or more, and may be about 60%, 70%, 80%, 90%, 95%, 99%, or a range between two of these values.

The laminated body may be laminated with a vapor deposition layer, a printing layer, a coating layer, an adhesive layer, or the like as a dissimilar material layer other than the resin layer. Examples of a dissimilar material include a metal such as aluminum, an inorganic compound such as silica or alumina, and the like. The printing layer, the coating layer, the adhesive layer, and the like may contain resins other than polyethylene as materials such as inks, paints, and adhesives. According to the laminate of the embodiment, the inner layer (the sealant layer) and the outer layer (the base layer), which are the main components of the laminated film, can be formed of the polyethylene-based resin film alone. With the above configuration, even if the laminate contains a dissimilar material, the amount of the material is very small, and thus the recyclability is not deteriorated.

The dissimilar material layer may be disposed between the inner layer and the outer layer of the laminate, or may be disposed on the outside of the outer layer of the laminate in the thickness direction. Examples of a method of forming the laminated film include, but are not particularly limited to, dry lamination, extrusion lamination, heat lamination, co-extrusion, coating, and the like. Different methods may be used to laminate each layer.

The laminate of the embodiment has a barrier layer between the inner layer and the outer layer. The barrier layer is laminated in contact with an outer surface of the inner layer. Further, in a case where the laminate has a printing layer, the printing layer is preferably laminated between the barrier layer and the outer layer. Preferably, the printing layer, the adhesive layer, or the like is not provided between the inner layer and the barrier layer. Accordingly, even if the barrier property of the inner layer is low, it is possible to curb the influence of the contents on the layer inside the barrier layer.

Examples of the barrier property include a barrier property against water vapor, a barrier property against an oxygen gas, a barrier property against an organic compound, and a barrier property against various low-molecular-weight components. The barrier layer may have two or more of these barrier properties. As the barrier layer, two or more barrier layers having the same or different barrier properties may be laminated. The material for forming the barrier layer is not particularly limited and may be appropriately selected from known barrier materials.

The polyethylene-based resin, which is suitably used as the material for the inner layer, such as the above-mentioned LLDPE and LDPE, has a relatively low density and a relatively large inter-molecular gap. Therefore, low-molecular-weight components such as perfumes and moisture easily permeate through the polyethylene-based resin. By laminating a dense material having a higher barrier property than the polyethylene-based resin as a barrier layer, it is possible to curb peeling and deterioration of the laminate, degeneration of the contents, and the like.

The thickness of the barrier layer is preferably 5 μm or less. Specific examples of the thickness of the barrier layer may be, but are not particularly limited to, about 5 μm, 4 μm, 3 μm, 2 μm, 1 μm, 0.5 μm, 0.2 μm, 0.1 μm, or a range between two of these values.

The barrier layer may be formed by depositing a metal such as aluminum, an inorganic compound such as silica or alumina, or diamond-like carbon (DLC) on the outer surface of the inner layer, for example.

The barrier layer may be formed of a barrier coat layer. The barrier coat layer can be formed by, for example, applying a barrier coat agent to the outer surface of the inner layer. Such a barrier coat agent can exhibit a barrier property by drying, curing, or the like.

Examples of the barrier coat agent include a reactive coat agent that contains a polymer compound containing a reactive functional group and a crosslinkable compound such as a metal compound or polyisocyanate. The reactive coat agent can exhibit a barrier property by reacting the crosslinkable compound with the reactive functional group to crosslink the polymer compound. Examples of the reactive functional group which can react with the crosslinkable compound include a hydroxyl group, a carboxyl group, an amino group, and the like.

Examples of the polymer compound containing a reactive functional group include one or two or more of polyvinyl alcohol, ethylene-vinyl alcohol copolymer (EVOH), a urethane-based polyol compound, an acryl-based polyol compound, an epoxy-based polyol compound, a polyacrylic acid, an acrylic acid-acrylic acid ester copolymer, a polysaccharide, an oxazoline group-containing compound, and the like.

Examples of the metal compound used as the crosslinkable compound include one or two or more of a metal alkoxide, a metal halide, a metal chelate compound, and the like. Examples of a metal element contained in the metal compound include silicon, titanium, zirconium, tin, aluminum, and the like. Examples of the metal alkoxide include a metal methoxide, an ethoxide, a propoxide, an isopropoxide, a butoxide, a phenoxide, and the like. Examples of the metal halide include a fluoride, a chloride, a bromide, an iodide, and the like. Examples of the chelate compound include a metal complex containing a hydroxycarboxylic acid such as a lactic acid, an aminocarboxylic acid, a phosphoric acid, or the like as a chelate ligand.

Examples of the polyisocyanate used as the crosslinkable compound include one or two or more of a diisocyanate compound such as hexamethylene diisocyanate, tolylene diisocyanate, xylylene diisocyanate, or isophorone diisocyanate, a polyisocyanate compound obtained as a derivative of the diisocyanate compound, and the like.

The barrier coat agent may be a coat agent containing a barrier polymer compound. Examples of the barrier polymer compound include polyvinylidene chloride, polyvinyl alcohol, an ethylene-vinyl alcohol copolymer (EVOH), and the like. The barrier layer can be formed by applying a paint obtained by dissolving or dispersing the barrier polymer compound in a solvent and then volatilizing the solvent.

The barrier coat agent may contain water or an organic solvent as the solvent. Examples of the organic solvent include one or two or more selected from an alcohol-based solvent such as methanol, ethanol, or 2-propanol; a ketone-based solvent such as acetone or methyl ethyl ketone; a glycol ether-based solvent such as 2-methoxyethanol or dimethoxyethane; an ester-based solvent such as ethyl acetate; and an aromatic solvent such as toluene.

As an additive, inorganic compound particles such as silica or alumina, a clay mineral, a filling material such as a filler, a silane coupling agent, an antioxidant, an ultraviolet absorber, a light stabilizer, an antistatic agent, a colorant a crosslinking agent, a crosslinking accelerator, a curing agent, or the like may be mixed to the barrier coat agent. The barrier layer may contain a resin, or may be a barrier layer containing no resin.

Examples of a coating device for the barrier coat agent include, but are not particularly limited to, a gravure coater, a knife coater, a reverse coater, a bar coater, a spray coater, a spin coater, a die coater, a slit coater, a roll coater, a dip coater, and the like. In a case where two or more barrier layers are stacked, different coating devices may be used for each barrier layer, or the same or the same type of coating device may be used.

The barrier layer and the outer layer may be laminated via an adhesive layer. The adhesive layer may be formed of an adhesive or an anchor coat agent. Examples of the material for forming the adhesive layer include, but are not particularly limited to, a urethane-based compound, an epoxy-based compound, an isocyanate-based compound, polyethyleneimine, an organic titanium compound such as a titanium alkoxide, and the like. Examples of the thickness of the adhesive layer include about 0.1 to 10 μm, about 1 to 6 μm, or about 3 to 4 μm. The adhesive layer may contain a resin, or may be an adhesive layer containing no resin.

The printing layer may be provided between the barrier layer and the outer layer. The printing layer can be formed by printing ink solidly or in a pattern by a printing method such as gravure printing, letterpress printing, offset printing, screen printing, or inkjet. Examples of the thickness of the printing layer include, but are not particularly limited to, about 0.5 to 10 μm. The printing layer may be formed on the entire surface of the laminate, or may be formed on a part of the surface of the laminate. Two or more printing layers may be stacked.

The ink for forming the printing layer may contain a coloring material such as a pigment or a dye and a binder. Examples of the binder include, but are not limited to, polyamide, polyurethane, polyester, polyvinyl chloride, polyvinyl acetate, a vinyl chloride-vinyl acetate copolymer, an acryl-based polymer, polybutadiene, cyclized rubber, and the like. The ink may contain a solvent such as water, an organic solvent, or a vegetable oil. After printing, the ink can be dried by volatilizing the solvent or curing the ink. In order to promote drying of the ink, heating, ultraviolet irradiation, or the like may be carried out. The printing layer may contain a resin, or may be a printing layer containing no resin.

In the laminate of the embodiment, a thin layer such as the barrier layer, the printing layer, or the adhesive layer may be a layer containing a resin. It is preferable that the relatively thick layers other than these be only polyethylene-based resin layers such as the inner layer and the outer layer. Examples of the thickness of the thin layer include 10 μm or less, or 5 μm or less as the thickness of each layer or the total thickness of the layers.

The laminate of the embodiment can be formed without laminating the other resin film except for using the polyethylene-based resin film for the inner layer and the outer layer. Therefore, there is no need to separate resin films of different types when disposing of them, and recycling is facilitated. Examples of the other resin film include, but are not limited to, a polypropylene-based film, a polyester-based film, a nylon-based film, and the like.

A method of manufacturing the laminate is not particularly limited, but only has to have, for example, a step of forming the barrier layer on the outer surface of a first film that serves as the inner layer, and a step of laminating a second film on the barrier layer formed on the first film. When the laminate has a printing layer and an adhesive layer, the method may have (1) a step of forming the barrier layer on the outer surface of the first film that serves as the inner layer, (2) a step of forming the printing layer on at least the inner surface of the second film that serves as the outer layer, and (3) a step of laminating the first film having the barrier layer and the second film having the printing layer via the adhesive layer. The order of the above steps (1) and (2) is not particularly limited, and either one may be performed first, or both may be performed in parallel.

A non-oriented polyethylene-based resin film is used as the first film. Further, an oriented polyethylene-based resin film is used as the second film. The dissimilar material layer such as the barrier layer, the printing layer, or the adhesive layer can be formed by laminating a material on a film by a film processing technique such as coating, vapor deposition, or printing.

Furthermore, the dissimilar material layer such as the printing layer may be laminated on the outside of the outer layer. For example, a protective layer such as the coating layer or the vapor deposition layer may be laminated on the outer surface of the laminate for the purpose of protecting the outer layer, the printing layer, or the like. Further, the obtained laminate may be made into a flat sheet or wound into a roll.

In a case where the outer layer is laminated on the barrier layer via the adhesive layer, examples of the layer structure of the obtained laminate include, but are not particularly limited to, "the inner layer/the barrier layer/the adhesive layer/the outer layer," "the inner layer/the barrier layer/the adhesive layer/the printing layer/the outer layer," "the inner layer/the barrier layer/the adhesive layer/the outer layer/the printing layer," "the inner layer/the barrier layer/the adhesive layer/the printing layer/the outer layer/the printing layer," "the inner layer/the barrier layer/the adhesive layer/the outer layer/the protective layer," "the inner layer/the barrier layer/the adhesive layer/the printing layer/the outer layer/the protective layer," "the inner layer/the barrier layer/the adhesive layer/the outer layer/the printing layer/the protective layer," "the inner layer/the barrier layer/the adhesive layer/the printing layer/the outer layer/the printing layer/the protective layer," and the like.

Further, in a case where the outer layer is laminated on the barrier layer without the adhesive layer using the barrier layer having adhesiveness, examples of the layer structure of the obtained laminate include "the inner layer/the barrier layer/the outer layer," "the inner layer/the barrier layer/the printing layer/the outer layer," "the inner layer/the barrier layer/the outer layer/the printing layer," "the inner layer/the barrier layer/the printing layer/the outer layer/the printing layer," "the inner layer/the barrier layer/the outer layer/the protective layer," "the inner layer/the barrier layer/the printing layer/the outer layer/the protective layer," "the inner layer/the barrier layer/the outer layer/the printing layer/the protective layer," "the inner layer/the barrier layer/the printing layer/the outer layer/the printing layer/the protective layer," and the like.

The laminate of the embodiment is in the form of a laminated film mainly formed of a polyethylene-based resin and can be used for various purposes. In order to form a package from the laminate, the inner layers of the laminates can be placed facing each other and the laminates can be joined by fusion bonding. Moreover, the inner layer and the outer layer may be faced and joined, or the outer layers may be faced and joined.

Examples of the package include a packaging bag such as a pouch or a bag, a tube, a container, a sleeve package, a strip packaging lid, and the like. Specific examples of the packaging bag include a three-side sealed bag, a four-side sealed bag, a pillow bag, a gusset bag, a standing pouch, and the like. In a case where the laminate is a flexible laminated film, a flexible package can be formed. The package may be formed solely from the laminate described above, or may be combined with an attached member such as a label, a tag, a straw, an outer box, or the like. From the point of view of recycling, it is preferable that the attached member can be separated from the package.

Although the dimensions of the package are not particularly limited, for example, when the package is used as a refillable container, the height in a vertical direction is, for example, about 100 to 500 mm, the width in a horizontal direction is, for example, about 70 to 300 mm, and the filling amount is, for example, about 100 cm³ to 5000 cm³. Examples of the state of the contents include fluid such as liquid, powder, or granules. The types of the contents include, but are not particularly limited, detergents, drugs, cosmetics, pharmaceuticals, beverages, seasonings, inks, paints, fuels, and the like.

Although the present invention has been described above on the basis of preferred embodiments, the present invention is not limited to the above-described embodiments, and various modifications are possible without departing from the gist of the present invention.

INDUSTRIAL APPLICABILITY

According to the present invention, it is possible to provide a laminate and a package which are formed of a mono-material and have a barrier property, and thus industrial application is possible.

REFERENCE SIGNS LIST

1 Laminate
2 Inner layer
4 Outer layer
6 Barrier layer
10 Standing pouch (package)
12 Container body
14 Spout member
16 Body film
18 Bottom film
20 Heat-sealed portion

The invention claimed is:
1. A laminate comprising:
an inner layer formed of linear low-density polyethylene (LLDPE) or low-density polyethylene (LDPE);
an outer layer formed of medium-density polyethylene (MDPE) or high-density polyethylene (HDPE); and
a barrier layer laminated between the inner layer and the outer layer,
wherein the inner layer is formed as a sealant layer that is an innermost layer of the laminate and is configured for joining the laminate,
wherein the barrier layer is laminated in contact with an outer surface of the inner layer,
wherein the barrier layer is a barrier coat layer formed by reacting a crosslinkable compound with reactive functional groups of a polymer compound to crosslink the polymer compound, and
wherein the barrier layer and the outer layer are laminated via an adhesive layer.
2. The laminate according to claim 1, wherein films included in the laminate are only the inner layer and the outer layer.
3. The laminate according to claim 1, wherein a base layer included in the laminate is only the outer layer.
4. The laminate according to claim 1, wherein the inner layer is formed of non-oriented linear low-density polyethylene (LLDPE) or non-oriented low-density polyethylene (LDPE), and the outer layer is formed of oriented medium-density polyethylene (MDPE) or oriented high-density polyethylene (HDPE).
5. The laminate according to claim 1, wherein a thickness of the barrier layer is 5 μm or less.
6. The laminate according to claim 1, wherein a printing layer is laminated between the barrier layer and the outer layer.
7. A package formed of the laminate according to claim 1.

* * * * *